Nov. 15, 1938.     O. K. GRAEF     2,137,138
SEGMENTAL BEARING
Filed May 22, 1936     2 Sheets-Sheet 1
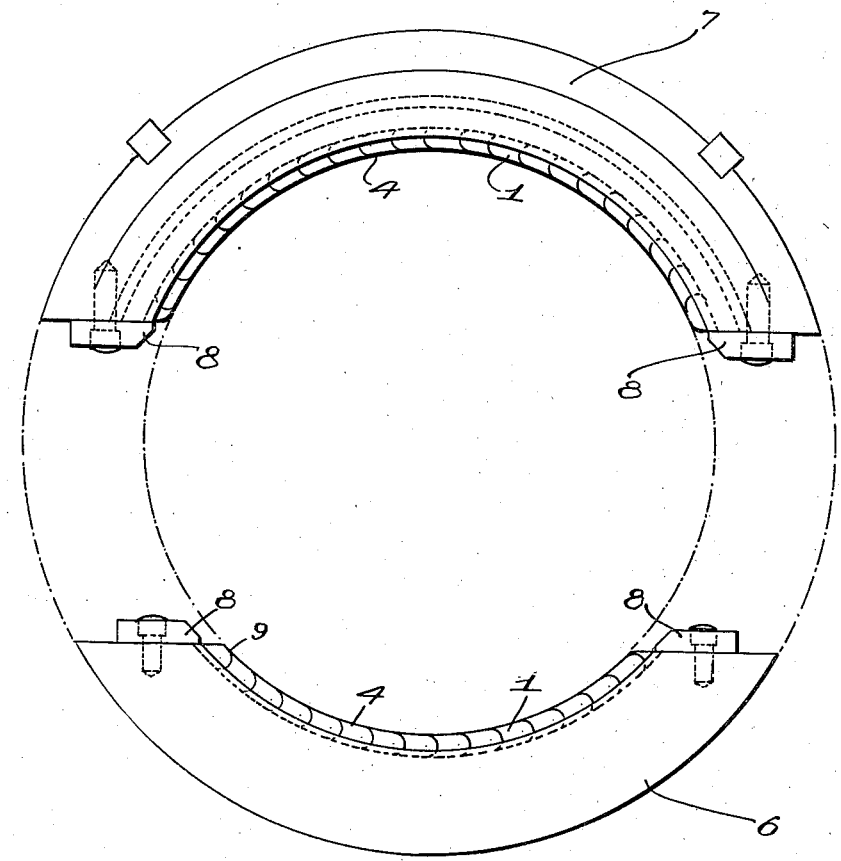
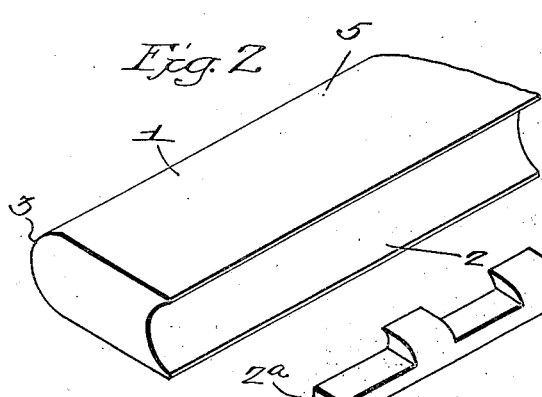
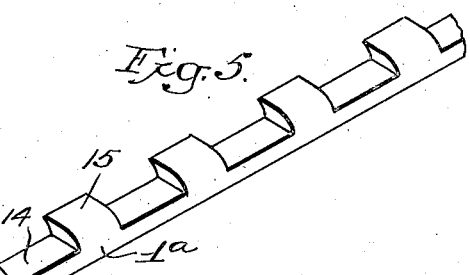
Inventor
Omar K. Graef
by his Attorneys
Howson & Howson Nov. 15, 1938.   O. K. GRAEF   2,137,138
SEGMENTAL BEARING
Filed May 22, 1936   2 Sheets-Sheet 2
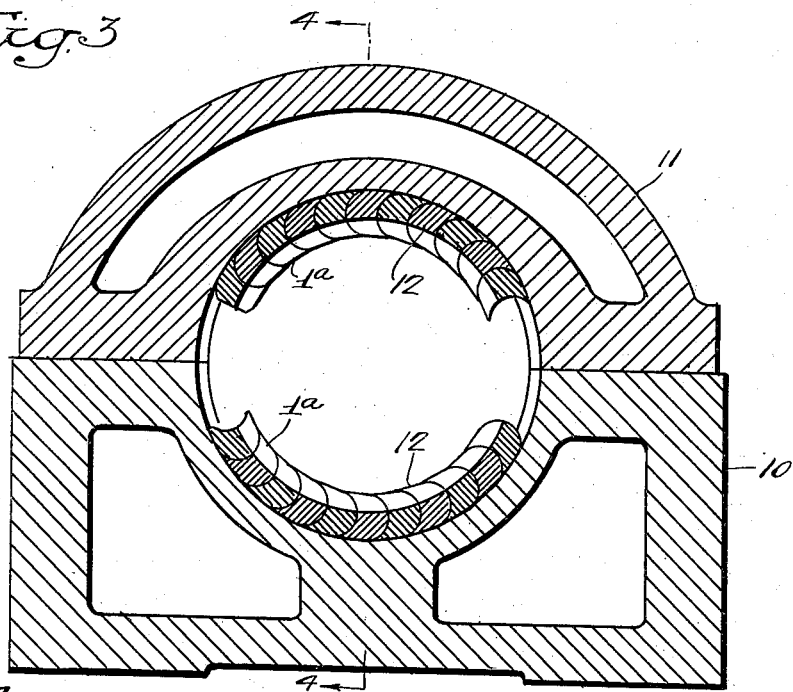
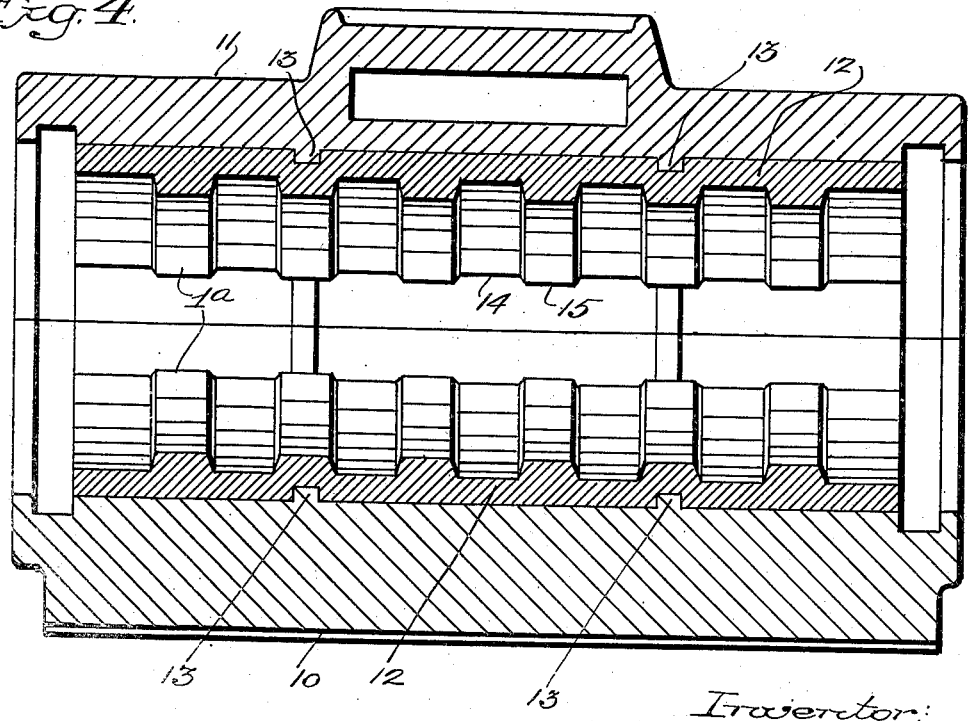
Inventor:
Omar K. Graef
by his Attorneys
Howson & Howson Patented Nov. 15, 1938

2,137,138

UNITED STATES PATENT OFFICE 2,137,138

SEGMENTAL BEARING

Omar K. Graef, Chicago, Ill., assignor to Continental-Diamond Fibre Company, Newark, Del., a corporation of Delaware Application May 22, 1936, Serial No. 81,321

5 Claims. (Cl. 308—237)

This invention relates to bearing structures and the like and has for its principal object the provision of a novel segmental bearing structure which greatly simplifies and lessens the costs of manufacture and assembly.

Another object of the invention is to provide a segmental bearing structure employing similar complemental segments which may be formed with a single die or mold or may be machined in the same manner, and by means of which various sizes of bearing structures may be formed to accommodate different sized shafts. The invention thus eliminates the necessity of making different sized bearings at the factory and the manufacturing expense incident thereto and it enables the assembly or formation of different sized bearings from standard stock segments.

Other objects and advantages of the invention will be apparent hereinafter as the description proceeds.

In the accompanying drawings:

Fig. 1 is an end elevational view illustrating a simple bearing assembly employing the segmental bearing structure of the invention;

Fig. 2 is a fragmentary perspective view of one of the segments which is preferably employed;

Fig. 3 is a transverse section of a marine type thrust bearing embodying the invention;

Fig. 4 is a sectional view taken along line 4—4 of Fig. 3; and

Fig. 5 is a fragmentary perspective view of one of the bearing segments employed in this instance.

Referring to Figs. 1 and 2 of the drawings, the bearing structure provided by the invention comprises a plurality of similar segments 1. As shown more clearly in Fig. 2, each of these segments is formed with a recess 2 along an edge portion of the segment, while the opposite edge portion is formed so as to provide a protuberant edge portion 3. The recess 2 and protuberant edge portion 3 preferably are arcuately shaped, as illustrated. These portions of the segment may, however, take other forms, for example, they may be V-shaped, the only requirement being that a recess of some sort and a corresponding opposite protuberant edge be provided so that the various segments are complemental one to another and may be arranged in the manner illustrated in Fig. 1 to form a bearing surface 4. It is to be noted that the contemplated structure avoids longitudinal cracks so that the film of the lubricant is not broken. The arcuate shape of the recess and protuberant edge, providing a concave surface and an opposite convex surface on each segment, is preferred because it is well adapted for arcuate or circular arrangement of the segments, as shown in Fig. 1, and enables the building up or assembly of different sized bearing structures.

The opposed sides 5 of each segment may be curved or acuately formed to provide a smooth cylindrical bearing surface when the segments are arranged in the manner shown in Fig. 1 but this is not necessary. Segments having flat surfaces 5, as illustrated on the drawings, have been found to provide a suitable bearing surface and, therefore, it is preferred to employ flat segments. The length of the segments will, of course, be determined by the axial length of the bearing surface desired. It will be seen that the preferred form of segment may be termed substantially book-shaped.

The segments may be formed of any suitable material such as synthetic resinous material, hard rubber, metal, hard wood such as lignum vitae, and the like. The segments may be molded or formed by means of a die or they may be cut and machined from flat material. The manner in which the segments are formed will, of course, depend to some extent upon the material to be used. In any case, since the segments are similar, a single mold, or die, may be employed, or comparable machining operations may be used in the production of the segments.

The segments are preferably composed of resin-impregnated fabric material, either in a laminated structure or molded to the desired form from small interspersed pieces. For example, fabric material impregnated with a synthetic resin binder, such as a phenolic resin and preferably a phenol formaldehyde resin, may be used, the resin-impregnated sheets being superposed to obtain the desired thickness. Scrap material resulting from the manufacture of laminated products may be advantageously employed since the use of such scrap material, which would otherwise be wasted, effects a saving in the cost of manufacture. In either case, if a thermosetting resin such as Bakelite is used, the fabric is impregnated with the resinous material in its initial stage and after the product has been assembled, the resin is converted to the final infusible, insoluble stage by a heat and pressure treatment in accordance with well-known practice.

The segments may be formed from the resin-impregnated fabric materials by methods similar to those now employed in the manufacture of other articles, such as gears. If small fibrous pieces are employed, they may vary in size generally from one-eighth inch at the smallest width up to one inch at the greatest width. The resin associated with the fibrous pieces may vary from 40% to 60% and at times powdered resin may be added if it is desired or necessary.

The segments, regardless of the material of which they are formed, may be held and supported in complemental relation to one another, as illustrated in Fig. 1, by any suitable supporting means. In the simple structure shown in Fig. 1, bearing chucks 6 and 7 are employed and are adapted to seat the arcuately arranged complemental segments, as illustrated. End plates 8 are used to hold the segments in place. The assembled bearing structure may be supported within a bearing housing.

In the commercial use of the segmental bearing provided by the invention, the segments may be economically manufactured at the factory and may be carried in stock so that orders may be filled from the stock supply, thereby eliminating delay incident to the molding of a bearing, as is necessary in prior practices. Bearings of various sizes may be built up or formed from the stock segments and it is merely necessary to arrange the segments as shown in Fig. 1 and, where necessary, to cut the end segments as shown, for example, at 9. In the manufacture of the segments, mass production methods may be employed, thus effecting substantial economy as compared with the prior practice of individual production of each of the various sized bearings. Furthermore, it will be seen that the assembly of the bearing structure employing the segments is simple and economical.

By virtue of their structure, the segments are slidable one upon the other to form an arc or arcuate surface which may vary within a substantial range. The configuration of the preferred form of segments permits variation in diameter or circumferential extent of the completed bearing without voids and without changing the shape or size of the segments. In practice, a relatively few different sizes of the segments will suffice for bearings throughout the size range normally encountered. For example, five or six different sized segments will be sufficient for the formation of bearings ranging from a diameter of four inches to a diameter of thirty-six inches.

Although the dimensions and sizes of the segments may be varied as desired, for convenience and economy in the commercial practice of the invention, the pitch of the segments in any instance may advantageously be made a fractional part of pi. In such case, the number of segments necessary in a given instance may be easily computed. For example, suppose that a bearing of 180° composed of segments one-half inch thick is required for a shaft having a diameter of 7½ inches. Obviously, the pitch diameter of the circumferentially arranged segments in this instance will be 8 inches. Suppose also that the pitch of the segments is chosen as $$\frac{pi}{5}$$

Since, in any case, the number of segments required may be computed by dividing the pitch circumference of the segments (or the fraction thereof employed) by the pitch of the segments, in the supposed example, the number of segments may be computed as follows:—

$$\frac{8 \times 3.1416 \times \frac{180}{360}}{\frac{3.1416}{5}} = 20$$

The commercial practice of the invention may be further expedited by assigning to different sized segments identifying numbers corresponding in each instance to the fractional part of pi assigned to the pitch of the segment. Thus, for a certain range of shaft sizes, certain segment sizes may be chosen, and the dimensions of the segments and numbers assigned thereto may be as follows:—

| Segment number | Segment pitch | Segment thickness | Minimum shaft sizes for which segments are suitable |
|---|---|---|---|
| 2 | $\frac{3.1416}{2}$ | Inches 1 | Inches 15 |
| 3 | $\frac{3.1416}{3}$ | ¾ | 10 |
| 4 | $\frac{3.1416}{4}$ | ⅝ | 8 |
| 5 | $\frac{3.1416}{5}$ | ½ | 6 |
| 6 | $\frac{3.1416}{6}$ | ⅜ | 4 |
| 8 | $\frac{3.1416}{8}$ | ¼ | 3 |

It will be seen that the number of each segment, in the above table, corresponds to the denominator of the fraction designating the segment pitch. Obviously such correlation of the segment sizes and the numbers assigned to the segments facilitates commercial use of the segmental bearing. It will be understood, of course, that the above table is given merely for the purpose of illustration.

In Figs. 3, 4 and 5, there is illustrated a modified form of the invention as applied to a thrust bearing of the marine type. Referring to Figs. 3 and 4, there is shown a bearing housing comprising parts 10 and 11. The segmental bearing is shown at 12 and comprises a plurality of segments 1a of the type illustrated in Fig. 5. Each segment has a concave surface 2a and an opposed convex surface 3a corresponding to the surfaces of the simple form shown in Fig. 2. These segments are arranged cooperatively about the inner circumference of the bearing housing, as shown clearly in Fig. 3. The segments and the housing members are provided with interlocking circumferential grooves and projections, as shown at 13, to lock the segmental bearing axially of the device.

As shown clearly in Fig. 5, each of the bearing segments is provided with alternate recesses and projecting portions 14 and 15, respectively, which are complemental to projections and recesses on the shaft, so that the bearing is interlocked with the shaft axially of the device as is common practice in thrust bearings. Aside from these adaptations of this particular segmental bearing for use in a thrust bearing, the device is of the same general character as the simple form illustrated in Figs. 1 and 2, and the discussion above relative to that form is applicable.

While the invention has been illustrated and described with reference to certain specific embodiments, various modifications are possible and are deemed to be within the scope of the invention. It will be apparent also that the invention is not limited to bearing structures but is applicable to bushings and other devices wherein friction between two surfaces is encountered.

I claim:

1. A segmental bearing structure adapted to adjust itself to different sized shafts, said structure comprising a plurality of arcuately arranged segments extending longitudinally of the bearing, said segments being similar in shape and size and having complemental concave and convex surfaces adapted to slide upon one another, thus adapting said segments to be arranged in arcs of different radii to accommodate different sized shafts, said concave and convex surfaces extending over substantially the entire thickness of the segment whereby the inner surfaces of the segments provide a substantially continuous bearing surface.

2. A segmental bearing structure adapted to adjust itself to different sized shafts, said structure comprising a plurality of arcuately arranged segments extending longitudinally of the bearing, said segments being similar in shape and size and each having a concave longitudinal surface and an opposed convex longitudinal surface engaging similar complemental surfaces on adjacent segments, the engaging complemental surfaces being slidable upon one another, thus adapting said segments to be arranged in arcs of different radii to accommodate different sized shafts, said concave and convex surfaces extending over substantially the entire thickness of the segment whereby the inner surfaces of the segments provide a substantially continuous bearing surface.

3. A segmental bearing structure adapted to adjust itself to different sized shafts, said structure comprising a plurality of arcuately arranged segments constructed entirely of bearing material and extending longitudinally of the bearing, said segments being similar in shape and size and having complemental concave and convex surfaces adapted to slide upon one another, thus adapting said segments to be arranged in arcs of different radii to accommodate different sized shafts, said concave and convex surfaces extending over substantially the entire thickness of the segment whereby the inner surfaces of the segments provide a substantially continuous bearing surface.

4. A segmental bearing structure adapted to adjust itself to different sized shafts, said structure comprising a plurality of arcuately arranged segments constructed entirely of bearing material and extending longitudinally of the bearing, said segments being similar in shape and size and each having a concave longitudinal surface and an opposed convex longitudinal surface engaging similar complemental surfaces on adjacent segments, the engaging complemental surfaces being slidable upon one another, thus adapting said segments to be arranged in arcs of different radii to accommodate different sized shafts, said concave and convex surfaces extending over substantially the entire thickness of the segment whereby the inner surfaces of the segments provide a substantially continuous bearing surface.

5. A segmental bearing structure adapted to adjust itself to different sized shafts, said structure comprising a plurality of arcuately arranged segments extending longitudinally of the bearing, said segments being similar in shape and size and having complemental concave and convex surfaces adapted to slide upon one another, thus adapting said segments to be arranged in arcs of different radii to accommodate different sized shafts, said concave and convex surfaces having their inner marginal edges substantially coincident with the edges of the inner faces of the segments whereby the inner surfaces of the segments provide a substantially continuous bearing surface.

OMAR K. GRAEF.